United States Patent

Ong et al.

Patent Number: 5,399,443
Date of Patent: Mar. 21, 1995

[54] FUEL CELLS

[75] Inventors: Estela T. Ong; Elias H. Camara, both of Chicago, Ill.

[73] Assignee: Electric Power Research Institute, Inc., Palo Alto, Calif.

[21] Appl. No.: 231,902

[22] Filed: Apr. 22, 1994

Related U.S. Application Data

[63] Continuation of Ser. No. 835,693, Feb. 12, 1992, abandoned.

[51] Int. Cl.[6] ............................................. H01M 8/14
[52] U.S. Cl. .................................... 429/33; 429/46
[58] Field of Search ................................. 429/33, 46

[56] References Cited

U.S. PATENT DOCUMENTS 4,079,171 3/1978 Marianowski et al. ............... 429/46
4,540,640 10/1985 Iacovangelo et al. ............... 429/41
4,710,436 12/1987 Nakamura et al. ............... 429/41

Primary Examiner—Stephen Kalafut
Assistant Examiner—M. Nuzzolillo
Attorney, Agent, or Firm—Hughes, Multer & Schacht

[57] ABSTRACT

Electrolyte matrix structures for molten carbonate fuel cells which: have a fine, uniform, and controlled porosity; are stable under operating conditions; and readily meet acceptable performance levels. These structures or matrices are easily manufactured by a simple and scalable technique from a slip containing particulate $LiAlO_2$ dispersed in an organic vehicle and an acrylic-based binder. The solvent is evaporated, leaving a flat, flexible, green structure. The green-structure is heated in a non-oxidizing atmosphere to thermally decompose and thereby remove the binder. This leaves a porous structure which is impregnated with molten carbonate by capillary action.

4 Claims, 4 Drawing Sheets

FUEL CELLS

This is a continuation of application Ser. No. 07/835,693, now abandoned, filed on 12 Feb. 1992.

The present invention relates to fuel cells and, more particularly, to the provision of novel, improved electrolyte matrixes for molten carbonate fuel cells.

BACKGROUND OF THE INVENTION

Fuel cells were invented in 1839 by Sir William Grove.

A fuel cell is an electrochemical device which directly combines a fuel and an oxidant such as hydrogen and oxygen to produce electricity and water. It has an anode and a cathode spanned by an electrolyte. Hydrogen is oxidized to hydrated protons on the anode with an accompanying release of electrons. At the anode, oxygen reacts with protons to form water, consuming electrons in the process. Electrons flow from the anode to the cathode through an external load, and the circuit is completed by ionic current transport through the electrolyte.

Fuel cells do not pollute the environment. They operate quietly, and they have a potential efficiency of ca. 80 percent. Virtually any natural or synthetic fuel from which hydrogen can be extracted—by steam reforming, for example—can be employed.

A variety of electrolytes have been proposed. These include: aqueous potassium hydroxide, concentrated phosphoric acid, fused alkali carbonates, and stabilized zirconium oxide. Molten carbonate fuel cell (MCFC) power plants are of particular interest. A MCFC power plant, for example, offers cost savings and increased efficiency in converting natural gas to electrical energy in comparison to other available techniques for accomplishing this goal such as using this abundantly available gas to fuel a gas turbine engine (potential conversion efficiency of 30%). Because of cost, performance, and endurance considerations, the basic components of a MCFC fuel cell must be: easily manufactured by simple scalable techniques, stable in the fuel cell, and able to meet threshold performance levels.

Of particular importance in these respects is the "electrolyte structure" of a MCFC. This consists of: (1) a porous matrix formed by packing submicron inert particles such as $LiAlO_2$, and (2) a carbonate phase which is retained within the pores by capillary action.

Until the early 1980's, hot pressing was used to make the electrolyte structures for molten carbonate fuel cells. The electrolyte powder was prepared by repeated blending and firing of submicron size $LiAlO_2$ and $Li_2CO_3$-$K_2CO_3$ mixtures evenly distributed in a steel die having the appropriate cavity size and geometry and then hot pressed at temperatures of 400° to 500° C. and pressures of 2000 to 5000 psi. The resulting product, called a hot-pressed tile, was directly used in fuel cells. The hot pressing process involves lengthy preparation of the needed electrolyte powder and a closely-controlled hot pressing technique. It is not practical for preparing large-scale multi-cell stackable components.

Another technique for making the electrolyte structures of MCFC's that has heretofore been proposed is tape casting. This approach, as described in U.S. Pat. No. 4,411,968, employs a polyvinyl butyral binder which leaves carbon residues when the cast structure is thermally treated to develop a porous, inert, matrix for the electrolyte structure. The presence of carbon is undesirable because it may inhibit wetting by the molten electrolyte. That may result in ineffective wetting of the lithium aluminate matrix by the electrolyte.

In yet another process for fabricating fuel cell electrolyte matrices, discrete and uniformly sized submicron matrix particles are coated with 10 volume percent carbonate. The resulting powder is milled, mixed with a plastic binder, and rolled into a thin sheet. Mixing and rolling are carried out hot—at 150° and 135° C., respectively. The resulting matrix has a 45% to 55% porosity and a mean pore size of 0.3 to 0.6 microns.

The roll-milling action leaves large interagglomerate pores in the matrix, and these have to be plugged—e.g., by using a blend of large and small particles. Also, the roll-milling process uses a polybutylene binder which melts at 125° C. and has a viscosity of 25,000 to 35,000 cp at 135° C. Paraffin wax is added to this binder as a lubricant. With a commercial $LiAlO_2$ powder added, the mixture has the viscosity of a thick glue at 150° C. This hampers efficient inter-particulate mixing, which is critical as the success of the matrix produced by the hot-roll milling technique is dependent on the homogeneity and uniformity of the powder/binder mixture.

SUMMARY OF THE INVENTION

The foregoing and other disadvantages of heretofore proposed techniques for fabricating electrolyte structures a matrices for molten carbonate fuel cells are eliminated by the processes for making such structures disclosed herein. In these novel processes, submicron size $LiAlO_2$ powders are suspended in a liquid vehicle containing a solvent and a binder and perhaps a plasticizer, wetting agent, or other constituent for promoting dispersion of the $LiAlO_2$ particles in the solvent/binder phase of the system. The slurry is then cast onto a flat substrate using a doctor blade. After drying to remove the solvent, the plastic constituents hold the $LiAlO_2$ particles together, forming a flexible, thin, flat structure.

Pore size and porosity depend upon the starting powder dispersion. Highly dispersed, fine powders yield lower porosity and a more uniform pore size than agglomerated powders. Powders having a mixture of sizes produce structures with lower porosities than monosized powders. Therefore, porous structures with a wide range of porosity and pore sizes can be prepared by the processes of the present invention. This is advantageous as it allows the properties of the electrolyte structure made from the cast tape to be matched to the needs of a particular fuel cell application. Furthermore, the thin, flat sheets of large surface area and with a uniform microstructure required for fuel cell electrodes and electrolyte structures of a practical capacity can be readily prepared by this process.

In tape casting fuel cell electrolyte structures by the novel technique disclosed herein, $LiAlO_2$ is dispersed in a "sea" of binder solution. The resulting slurry is cast on a flat surface. After casting, the dispersed particles are drawn closer together as the solvent of the vehicle is evaporated. This leaves the tape-cast matrix porous (−20% porosity) after the solvent evaporates. That makes subsequent binder removal less of a problem than it is in other heretofore proposed tape fabrication techniques such as the hot roll-milling process described above.

The $LiAlO_2$ tapes are assembled in face-to-face relationship with carbonate electrolyte tapes. The assembled tapes are heated with an inert gas such as $N_2$. The binder is first removed from the tapes by this thermal process. Later, the carbonate melts and impregnates the $LiAlO_2$ matrix (or structure) by capillarity. The preferred acrylic-based binder can be thermally removed at a temperature below 350° C. This is below the 487° C. melting point of the mixture of lithium and potassium carbonates typically employed in the carbonate tapes. Therefore, binder removal does not interfere with the impregnation of the electrolyte structure with the carbonate.

This technique is simpler and more easily carried out than the impregnation process disclosed in the above-cited U.S. Pat. No. 4,411,968. In the patented process, the $LiAlO_2$ tapes must be hot-laminated with a porous nickel bubble barrier structure and then assembled in the fuel cell. The electrolyte required to impregnate the $LiAlO_2$ tape must then be separately loaded into the anode structure of the cell.

It is also possible to incorporate the carbonate directly into the matrix or tape ab initio by basing the matrix on a carbonate/$LiAlO_2$ electrolyte powder. In general, this approach is deemed inferior to that employing impregnation because the grain sizes of such composites are generally larger than discrete $LiAlO_2$ particles. This may result in the tape having undesirably large intergranular pores.

The binder removal and subsequent impregnation processes are best carried out within the fuel cell during start up. Out-of-cell impregnation can be employed. If it is, the same heat-up and pressure conditions as exist in-cell are required to maintain structural flatness and integrity.

Because fuel cell electrodes, especially the anode, must be prevented from oxidation, the binder must be one that can be thermally removed in an environment inert to the electrodes. Acrylic-based binders are noted for their clean decomposition in nitrogen, and their other properties also suit them for the purposes of the present invention. Ready-mixed, acrylic-based binder systems are commercially available. One suitable binder is Metoramic Sciences, Inc. CB-131 binder. Other suitable binders are the same company's B73180, B73181, B73185, and B73190, all of which contain film-forming acrylic polymers.

Under normal cell operating conditions, an electrolyte structure or matrix employing the principles of the present invention has a microstructure consisting of submicron $LiAlO_2$ particles held together by the electrolyte melt by virtue of capillarity.

Important and distinguishing characteristics of the tape-cast mixtures fabricated in accord with the principles of the present invention are summarized in Table 1 below:

TABLE 1

| | |
|---|---|
| Porosity: | 45%–67%* |
| Mean Pore Size: | 0.25–3.0 μm |
| Thickness: | 0.005–0.035 in. |
| $LiAlO_2$ Characteristics: | Discrete 10–30μ size particles or agglomerates of submicron particles, or a mixture of both |
| Binder Content: | 15–25% |

*After removal of the binder

The mean pore size of the matrix can be readily tailored over the span of the 0.25 to 3.0 μm range by blending low surface area ($\sim 1$ m$^2$/g) and high surface area ($\sim 15$ m$^2$/g)$LiAlO_2$ powders. The low surface area particles have a size of 10–30 microns, and the high surface area particles a size of about 0.5 microns.

Electrolyte structures of the character described above are not prone to cracking as has too often heretofore been the case, and the performance of the cells in which they are employed is superior to that of cells with conventional hot pressed electrolyte structures. Furthermore, the novel electrolyte matrixes disclosed herein are easily manufactured by simple scalable techniques, possessed of the fine and uniform pore structure needed for successful operation of the fuel cell in which the tape is installed, stable in the fuel cell, and able to easily to meet minimum performance levels.

From the foregoing, it will be apparent to the reader that one important and primary object of the present invention is the provision of novel, improved, $LiAlO_2$ electrolyte structures or matrices for fuel cells.

A related, also important and primary object of the invention is the provision of novel tape casting-based methods for fabricating electrolyte structures as characterized in the preceding paragraph.

Still other important objects and features and additional advantages of the invention will be apparent to the reader from the foregoing and the appended claims and as the ensuing detailed description and discussion proceeds in conjunction with the accompanying drawings.

DETAILED DESCRIPTION OF THE INVENTION

Figure 1:
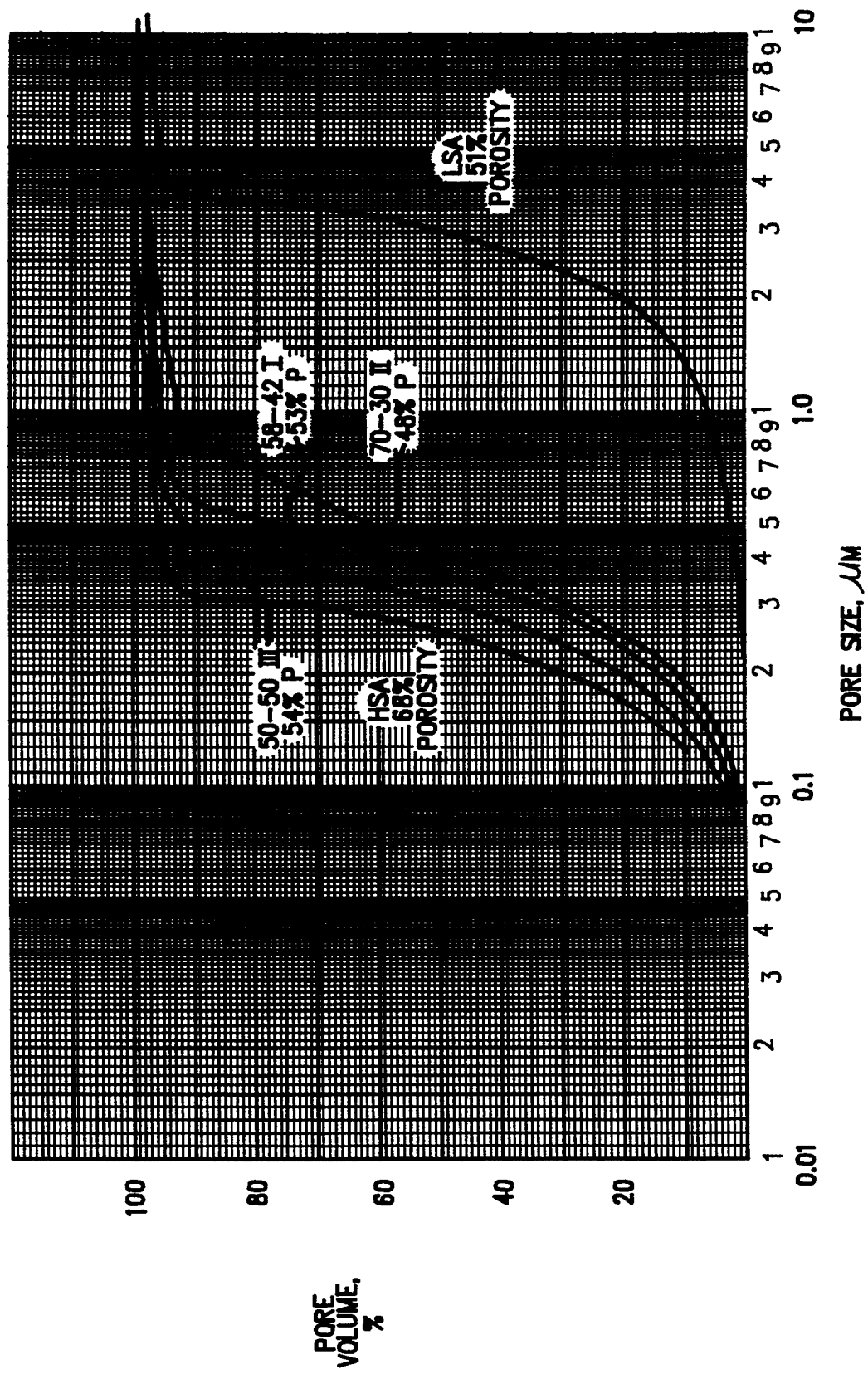
FIG. 1 shows the pore size distribution for representative tapes of the present invention, after a binder employed in making the tape has been removed but before the tape is impregnated with electrolyte.

As discussed above, the present invention is concerned with the low-cost, high-rate fabrication of a molten carbonate fuel cell (MCFC) electrolyte structure by tape casting. The tape casting process entails suspending a $LiAlO_2$ powder in an organic vehicle to form a slurry or slip. The slip is cast onto a smooth substrate using a doctor blade to control the thickness of the casting. After drying the tape, the organic constituents of the original formulation (binders, plasticizers, etc.) are removed to produce a porous $LiAlO_2$ matrix that is subsequently impregnated with carbonate to provide the electrolyte structure.

A variety of $LiAlO_2$ powders can be employed.

For example, this powder can be produced by spray drying an aqueous slurry containing LiOH and $Al_2O_3$. The product is predominately $\beta$-$LiAlO_2$ having a surface area of 35 to 40 m$^2$/g. Heat treatments at high temperatures result in $\beta$- to $\gamma$-$LiAlO_2$ phase transformation and a reduction in surface area.

Or, as a further example, the $LiAlO_2$ powder can be produced by heat treating an equimolar mixture of $Li_2CO_3$ and $Al_2O_3$. This approach can be employed to produce $\gamma$-$LiAlO_2$ having a surface area of 15 to 20 m$^2$/g.

Commercially available $LiAlO_2$ powders are produced by Ventron and Lithco. These powders are relatively coarse grained and are milled to reduce the particles to a size which will support the high levels of carbonate electrolyte needed for efficient fuel cell operation.

Target pore characteristics for a tape cast electrolyte structure employing the principles of the present invention are those for a typical hot-pressed electrolyte structure; viz., the same 62 to 67 volume percent pores although pore volumes ranging from 45 percent to 67 percent are acceptable. These specifications were easily met with tapes cast from spray-dried $LiAlO_2$ slips. Examination of the tapes by scanning electron microscopy (SEM) revealed spherical agglomerates typical of the spray-dried powder. The typical pore-size distribution of these tapes was bimodal with smaller pores likely to be within agglomerates and larger pores apt to be between agglomerates. Similar microstructures and pore-size distributions were obtained with a variety of binders.

The $LiAlO_2$ product of the high temperature reaction between $Al_2O_3$ and $Li_2CO_3$ offers a low-cost material for the matrix. As mentioned above, the product is $\gamma$-$LiAlO_2$ with a surface area of about 15 $m_2$/g. Slurries of this $LiAlO_2$ product have been successfully tape cast. The $LiAlO_2$ microstructure consists of agglomerates of submicron particles. Finer particulate dispersions can be employed to produce a finer pore structure from this powder.

Commercial Lithco $LiAlO_2$ is a coarsely granulated powder. Tapes made with this powder had a porosity of 45% to 55% with a sharp pore-size distribution curve.

Tape cast structures based on spray dried $LiAlO_2$ have high porosity and high surface area. However, the $LiAlO_2$ powders obtained from commercial vendors have been made to work effectively; and they have the advantage of costing significantly less. To date, in fact, tapes fabricated from Lithco $LiAlO_2$ have shown the best performance (890 mV at 160 $mA/cm^2$) in small cells after in-cell binder removal and carbonate impregnation.

Traditionally, both organic and aqueous vehicles have been employed in forming slips for tape casting. However, as $LiAlO_2$ reacts with water, organic vehicles are necessarily employed for the purposes of the present invention.

The tape casting vehicle contains a solvent and a binder and may contain such additional and conventional components as a plasticizer, deflocculant, wetting agent, antifoaming agent, etc. One vehicle which contains the necessary ones of those ingredients in proportions and with characteristics suitable for the purposes of the present invention contains 40 g of methylene chloride and 60 g of Metoramic Sciences, Inc. CB-131 binder.

Lithium aluminate powder to casting vehicle weight ratios of from 0.2:1.0 to 1.0:1.0 can be employed. Ratios for particular applications are based on the surface area of the lithium aluminate powder.

A vibrating mill can be employed to disperse the $LiAlO_2$ powder in the vehicle. The resulting slurry (or slip) is continuously cast onto a smooth surface with a moving doctor blade being used to control the thickness of the casting. Then the solvent is removed. This leaves a thin, flat, but flexible structure (or green tape). The solvent can be removed by air drying the casting under a hood. However, in manufacturing castings employing the principles of the present invention in commercial quantities, a tape caster with drying sections is preferred. Suitable tape casters of this character are commercially available.

The following examples describe the preparation of green $LiAlO_2$ tapes by tape casting in accord with the principles of the present invention as discussed above.

EXAMPLE I

The following materials were added to a pint size milling bottle:
300 g $Al_2O_3$ balls
60 g Foote high surface area $LiAlO_2$
90 g CB-131 binder
100 g methylene chloride The mixture was vibratory milled for 30 minutes. After milling, the viscosity of the slurry was as 400 cps. The slurry was degassed under vacuum (a weight loss of 34 g was noted). The tape was cast at a doctor blade opening of 0.070 in., and the casting was dried under a hood. The dried tape was 0,030 in thick.

EXAMPLE II

The following materials were added to the pint size milling bottle:
300 g $Al_2O_3$ balls
30 g high surface area Foote $LiAlO_2$
100 g CB-131 binder
40 g methylene chloride After vibratory milling the above mixture for 30 minutes, 30 g of low surface area Foote $LiAlO_2$ was added; and the mixture was vibratory milled for an additional 30 minutes. The slip viscosity was 750 cps after milling. The slurry was thoroughly degassed and cast at a blade height of 0.050 in. The dried tape thickness was 0.025 in.

EXAMPLE III

The following materials were added to the pint size milling bottle:
300 g $Al_2O_3$ balls
24.7 g high surface area Foote $LiAlO_2$
100 g BC-131 binder
40 g methylene chloride After vibratory milling the above mixture for 30 minutes, 35.3 g of low surface area Foote $LiAlO_2$ was added; and the mixture was vibratory milled for an additional 30 minutes. The slip viscosity was 550 cps after milling. The slurry was thoroughly degassed and cast at a blade height of 0.050 in. The dried tape thickness was 0.019 in.

EXAMPLE IV

The following materials were added to the pint size milling bottle:
300 g $Al_2O_3$ balls
18 g high surface area Foote $LiAlO_2$
80 g CB-131 binder
40 g methylene chloride After vibratory milling the above mixture for 30 minutes, 42 g of low surface area Foote $LiAlO_2$ was added; and the mixture was vibratory milled for an additional 30 minutes. The slip viscosity was 900 cps after milling. The slurry was thoroughly degassed and cast at a blade height of 0.050 inch. the dried tape thickness was 0.021 inch.

EXAMPLE V

The following materials were added to the pint size milling bottle:

300 g $Al_2O_3$ balls
60 g low surface area Foote $LiAlO_2$
60 g CB-131 binder
40 g methylene chloride The mixture was milled for 60 minutes. The slip viscosity was 250 cps after milling. The slurry was thoroughly degassed and cast at a blade height of 0.050 inch. The dried tape thickness was 0.025 inch.

FIG. 1 shows the pore size distributions in the EXAMPLES I-V tapes after removal of the binder but before impregnation with molten carbonate.

The foregoing examples show that $LiAlO_2$ tapes with significant variations in such important parameters as pore size, porosity, and thickness can readily be prepared by utilizing tape casting processes employing the principles of the present invention. They also show, in this respect, that a mixture of $LiAlO_2$ powders with different physical properties can be employed to tailor the characteristics of the tape for optimal performance in a particular fuel cell application.

In formulating the slips characterized in EXAMPLES II-IV, the binder-to-powder ratio is increased as a larger fraction of high surface area $LiAlO_2$ powder is employed. This is because the high surface area (or finer) powder has a higher bulk volume, and more binder is needed to fill its pores.

It was pointed out above that a $LiAlO_2$ tape of the present invention, including those particular ones characterized in EXAMPLES I-V, can be impregnated with carbonate by: (1) placing it in face-to-face relationship with a carbonate tape, and (2) then heating the tapes in a non-oxidizing atmosphere first to a temperature at which the binder decomposes and then to a level at which the carbonate melts and is wicked into the $LiAlO_2$ tape by capillary action. A representative, and appropriate, temperature schedule for binder burnout and electrolyte impregnation involves heating a fuel cell in which the green tapes are installed from room temperature to 650° C. over a period of 50 hours. Nitrogen is supplied to the cell at both the anode and the cathode until the cell reaches a temperature of about 350° C. At that point, a changeover to normal oxidant and fuel gases at design flow rates is made.

The following example demonstrates this aspect of applicants' invention.

EXAMPLE VI

Figure 4:
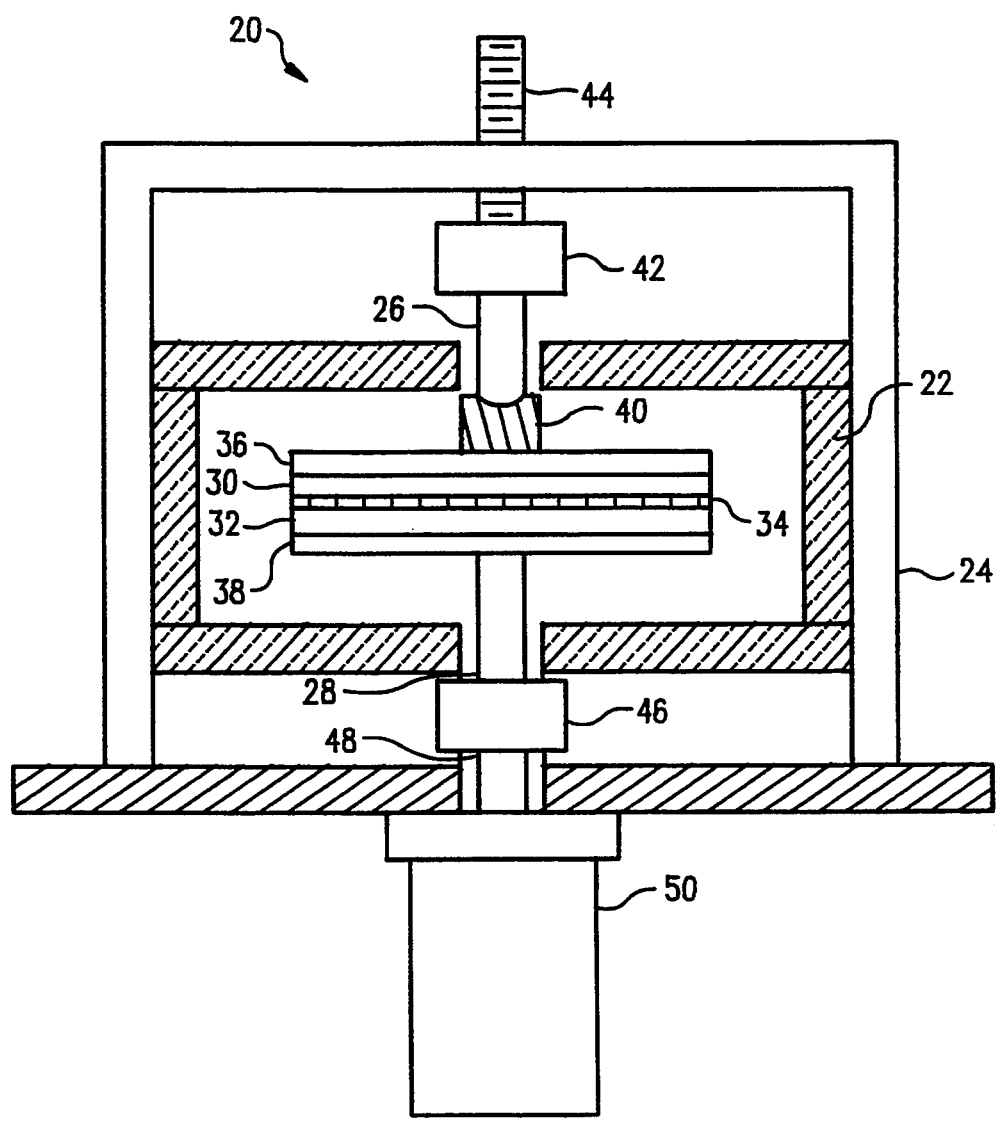
FIG. 4 is a primarily pictorial section through a MCFC equipped with a $LiAlO_2$ matrix prepared and impregnated with a molten carbonate electrolyte in accord with the principles of the present invention.

A fuel cell of the configuration illustrated in FIG. 4 and identified by reference character 20 was assembled and operated to demonstrate that in situ binder removal from a green, tape cast, electrolyte matrix and the subsequent impregnation of that matrix with a molten carbonate electrolyte is feasible.

Fuel cell 20 has an insulated shell 22 supported from a structural framework 24. Supported in shell 20 by upper and lower, stationary and displaceable ram posts 26 and 28 are an anode 30 and a cathode 32 separated by an assembly 34 of green electrolyte and lithium aluminate matrix tapes. The foregoing fuel cell components are sandwiched between upper and lower, resistance heaters 36 and 38.

Upper resistance heater 36 is attached by a misalignment accommodating ball-and-socket unit 40 to the lower end of stationary ram post 26. The latter is connected by a cooling collar 42 to a support post 44. At its upper end, post 44 is threaded into fuel cell framework 24.

Lower ram post 28 fixed to the lower resistance heater 38. The bottom end of this post is connected through a second cooling collar 46 to the piston rod 48 of a pneumatic cylinder 50.

Preumatic cylinder 50 is used to clamp the electrodes and tapes together under pressure.

The matrix tape in assembly 34 was formed by laminating together two 4.5-in. ×4.5 in. tapes (TLA-1Q-7) at 30,000 psi. The tapes were cast from spray-dried high surface area $LiAlO_2$. The resulting laminate had a thickness of 44 mils and a porosity of 62%.

Anode 30 was pre-impregnated with the amount of carbonate required by the electrodes.

It was estimated that, after binder removal, 17.3 g of molten carbonate electrolyte would be required to fully impregnate the matrix and produce an electrolyte structure containing about 55 weight percent carbonate. A carbonate powder tape cut to the same size as the $LiAlO_2$ tapes and containing an estimated 17.7 g of carbonate was prepared to supply the carbonate to the $LiAlO_2$ matrix. The carbonate and $LiAlO_2$ tapes were heated to 150° C. for 18 hours prior to cell assembly for partial binder removal (~25% of the original organic constituents remained after this treatment). The carbonate tape was placed on top of the $LiAlO_2$ tape, and the tapes were then assembled in cell 20 as shown in FIG. 4.

Initially, a 4 psi holding force was applied to the assembly; and nitrogen gas was introduced to both anode 30 and cathode 32 at rates of 565 and 975 cc/min, respectively. The cell assembly was heated to 330° C. over a period of 7 hours. Thereafter, the gases were changed to fuel and oxidant at design flow rates; and the cell was heated to the 650° C. operating temperature.

Particulars on the fuel and oxidant are:

Fuel: 60% $H_2$+40% $CO_2$, dewpoint 60° C., 75% utilization

Oxidant: 75% air+25% $CO_2$, dewpoint 25 C., 50% utilization

Post-test inspection revealed a fragmented $LiAlO_2$ matrix, probably due to incomplete removal of the binder. However, the carbonate had melted and impregnated the $LiAlO_2$ matrix to the extent allowed by the incomplete removal of the binder. Thus, the stated objective of demonstrating that green cast tapes embodying the principles of the present invention can be converted in situ to $LiAlO_2$ matrixes and impregnated with molten carbonate electrolytes was realized.

The following example shows how a green carbonate tape of the character utilized in the run described in the preceding example can be made.

EXAMPLE VII

Sixty grams of CB-131 binder and 40 g of methylene chloride were added to a 250 ml beaker and stirred under cover for 5 minutes. To the resulting solution was added 100 g of −80 mesh premelted $Li_2CO_2/K_2CO_2$ powder. The contents of the beaker were then stirred for 30 minutes to form a slurry. The slurry was cast on a Teflon coated glass plate with a doctor blade to a thickness of 5-150 mils, depending upon the targeted dry (or green) tape thickness.

Slurries prepared in the manner just described may thicken to an extent which makes them difficult to cast due to solvent evaporation. This can be remedied by stirring additional methylene chloride into the slurry.

If the slurry is bubbly, degassing may be necessary. This can be accomplished by placing the slurry under vacuum or by rolling the slurry in a cylindrical container.

As in the case of the lithium aluminate matrix tapes, the ratio of the powder to the vehicle or carrier in the slurries from which the tapes are cast is based on the surface area of the powder. Operable powder/vehicle weight ratios range from 0.5:1 to 2.5:1.

EXAMPLE VIII

Carbonate powders for the tape casting process described in EXAMPLE VI are prepared by mixing reagent grade $Li_2CO_3$ and $K_2CO_3$ powders and heating the mixture in a clean alumina crucible above 600° C. (preferably between 600°–800° C.) in air for 2–8 hours. The melt is then poured into a metallic pan, preferably made of aluminum, to solidify. The solid mass is ground by mortar and pestle and sieved through a 4 to 20 mesh screen. These coarse granules are further ground by ball milling and then sieved through an 80 mesh screen.

In general, any electrolyte composition covering the liquidus phase of the $Li_2Co_3$, $Na_2Co_3$ and $K_2CO_3$ ternary phase diagram in which the $Li_2Co_3$ content ranges form 30 to 80 mole %, the $Na_2Co_3$ content ranges from 0 to 60 mole %, and the $K_2CO_3$ content, 0–60 mole % may be employed in the carbonate. Additives such as Ca, Mg, Ba, Sr alkaline earths may also be incorporated to the mixture.

The specific powder described in this example contained 70 mole % $Li_2Co_3$ and 30 mole % $K_2Co_3$. Another representative and suitable composition is the 62 mole % $Li_2Co_3$-38 mole % $K_2CO_3$ eutectic.

EXAMPLE IX

Test cells EPRI-68 and EPRI-69 were started and run to verify that the tape cast $LiAlO_2$ matrices of the present invention are suitable for the purposes for which they are intended and to further demonstrate that the wicking techniques discussed above can satisfactorily be employed to impregnate such matrices with carbonate.

The electrolyte matrices for cells EPRI-68 and EPRI-69 (TLA) were made from a mixture of 50% high surface area $LiAlO_2$ (HSA-LA) and 50% low surface area mixing reagent grade $Li_2CO_3$ and $K_2CO_3$ powders and heating the mixture in a clean alumina crucible above 600° C. (preferably between 600°–800° C.) in air for 2–8 hours. The melt is then poured into a metallic pan, preferably made of aluminum, to solidify. The solid mass is ground by mortar and pestle and sieved through a 4 to 20 mesh screen. These coarse granules are further ground by ball milling and then sieved through an 80 mesh screen.

In general, any electrolyte composition covering the liquidus phase of the $Li_2Co_3$, $Na_2Co_3$ and $K_2CO_3$ ternary phase diagram in which the $Li_2Co_3$ content ranges form 30 to 80 mole %, the $Na_2Co_3$ content ranges from 0 to 60 mole %, and the $K_2CO_3$ content, 0–60 mole % may be employed in the carbonate. Additives such as Ca, Mg, Ba, Sr alkaline earths may also be incorporated to the mixture.

The specific powder described in this example contained 70 mole % $Li_2Co_3$ and 30 mole % $K_2Co_3$. Another representative and suitable composition is the 62 mole % $Li_2Co_3$-38 mole % $K_2CO_3$ eutectic.

EXAMPLE IX

Test cells EPRI-68 and EPRI-69 were started and run to verify that the tape cast $LiAlO_2$ matrices of the present invention are suitable for the purposes for which they are intended and to further demonstrate that the wicking techniques discussed above can satisfactorily be employed to impregnate such matrices with carbonate.

The electrolyte matrices for cells EPRI-68 and EPRI-69 were made from a mixture of 50% high surface area $LiAlO_2$ (HSA-LA) and 50% low surface area $LiAlO_2$ (LSA-LA), both produced by Cyprus Foote Minerals. The matrices were prepared by mixing 60 g of HSA-LA, 210 g of CB-131 binder solution and 80 g of methylene chloride in a quart size milling bottle with 500 g of ½ inch alumina balls; placing the sealed bottle in a vibratory mill; and shaking it for 30 minutes. Then 60 g of LSA-LA was added to the bottle, which was again shook for 30 minutes. The viscosity of the slurry was measured and found to be 400 cps. The mixture was degassed under vacuum for about 10 minutes and cast with a doctor blade at a blade opening of 60 mils on a Teflon-coated glass plate. The resulting castings were air dried. The dried tape thickness was about 27 mils, and the porosity was 61%.

To further reduce the porosity and hence pore size, the tapes were cut into 1.25 inch diameter circular disks and pressed at 10,000 psi. The porosity was reduced to 45% and the thickness to 18 mils.

The tapes were assembled in fuel cells in the green state (solvent removed by drying and binder partially removed) to implement in-cell binder removal and carbonate impregnation of the tape matrix.

The test cell had a 3 $\overline{cm^2}$ active area, prefilled anodes and cathodes, and an anode bubble barrier. Provision was made for heating the tapes in the cell under controlled temperature conditions and in a nitrogen atmosphere. Both cells had an Ni+10 Cr anode, an Ni+20 $LiAlO_2$ anode bubble barrier, and an Ni cathode. They were operated at 650° C. with 75% $H_2$/25% fuel humidified to a 60° C. dewpoint and introduced at a flow rate for 7.5% $H_2$ utilization. The oxidant was 30% $CO_2$/70% air humidified to a 25° C. dewpoint and flowed to a 15% utilization. Both cells were heated to 650° C. over a 52 hour period in dry $N_2$. Oxidant and fuel gases were introduced when the cell temperature reached 550° C.

A 62% Li/38% K eutectic carbonate was initially provided to this cell in an amount sufficient to completely fill the matrix and the bubble barrier and to partially fill the electrodes. The carbonate electrolyte was provided in the form of granular powder; the powder was placed on top of the anode current collector.

Figure 2:
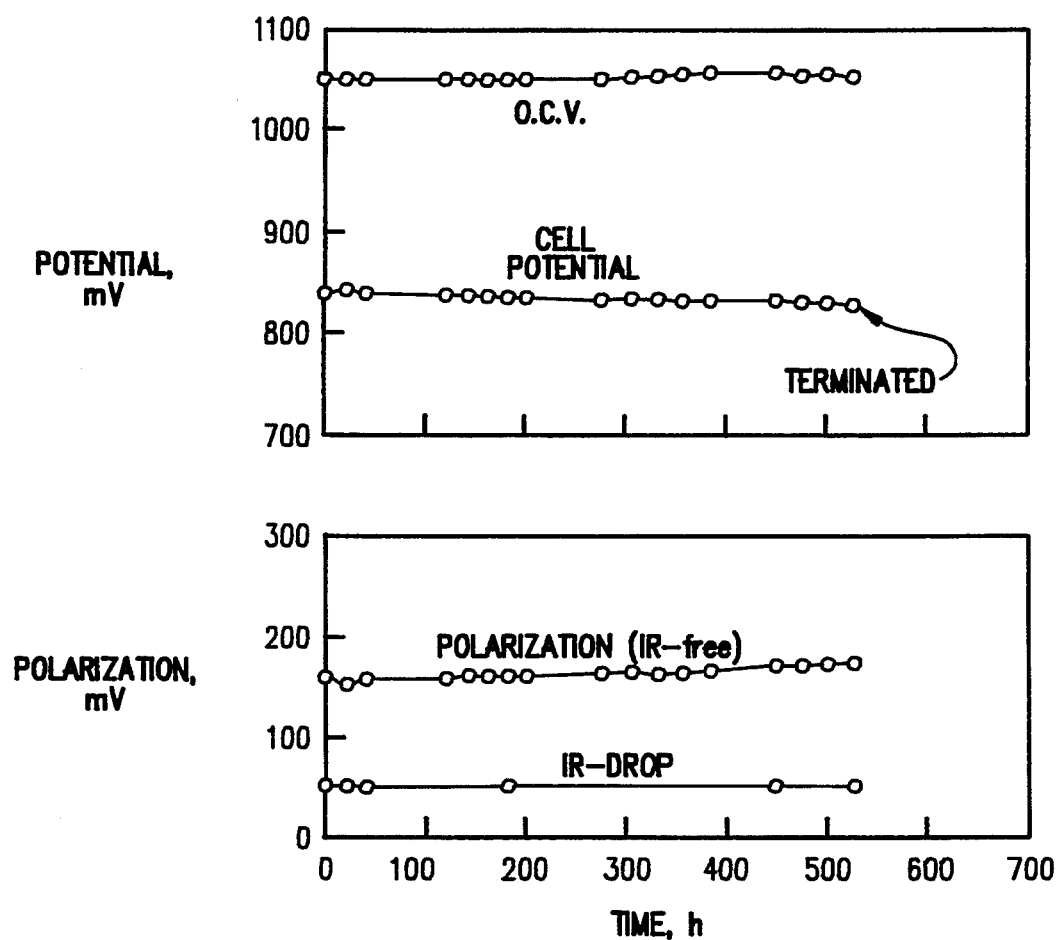
FIG. 2 depicts, in graphical form, the performance of a fuel cell equipped with a representative electrolyte structure as disclosed herein.

The performance of the cell EPRI-68 is shown in FIG. 2. It operated 530 hours and showed good OCV (1053 mV), low IR drop (55 mV), and good peak cell output (850 mV at 160 mA/cm$^2$). By comparison, a standard cell assembled with hot-pressed tile yields the same OCV, an approximately 85 mV IR drop, and an approximately 870 mV potential output. The lower IR drop (by 30 mV) for cell EPRI-68 was due to a thinner electrolyte. The polarization of cell EPRI-68, however, was 50 mV higher than that of a standard cell. If the polarization of this cell had been similar to that of a hot-pressed one, a 900 mV cell potential would have been obtained.

The microstructure of the electrolyte matrix was examined by SEM after the test. The electrolyte matrix contained discrete pores as large as 10 microns in size. Otherwise, the rest of the microstructure appeared to be fully impregnated (FIG. 4 bottom). Carbonate expands upon melting by approximately 15%, so the large pores observed in these micrographs would be expected to be somewhat smaller at cell operating temperatures.

Cell EPRI-69 was assembled to test the performance of a tape cast electrolyte matrix with improved particle-size distribution.

In cell EPRI-69, the same cell fixture, gases, and heat-up schedule as in cell EPRI-68 were used. Two thin tapes were stacked together to form the a matrix. Carbonate was added in an amount calculated to completely fill the tape matrix and the anode bubble barrier and to partially fill the pores of the electrodes.

Figure 3:
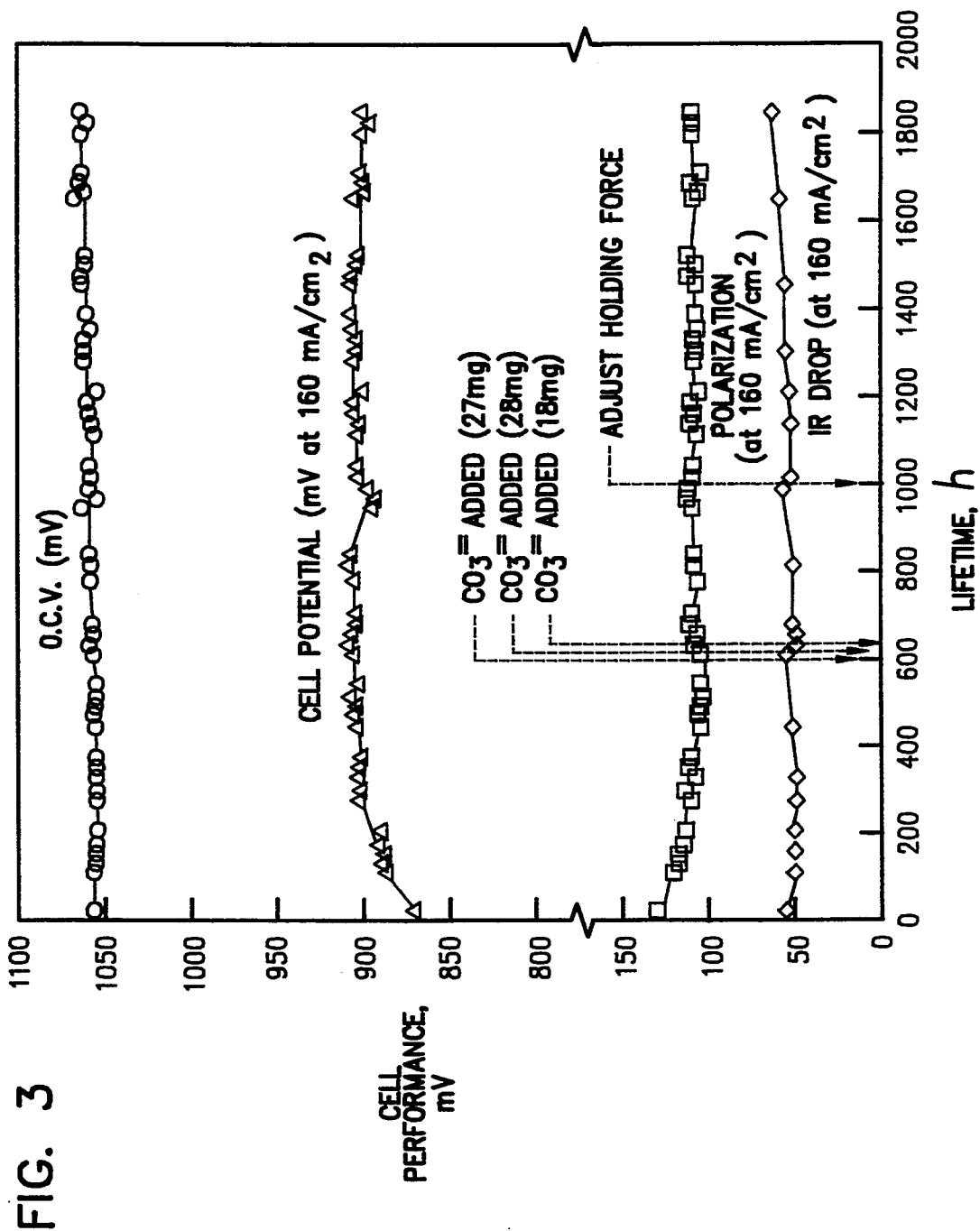
FIG. 3 depicts, graphically, the performance of a fuel cell in which a matrix embodying the principles of the present invention was installed.

The cell lifegraph is presented in FIG. 3. It reached a steady potential of 900 mV at 160 mA/cm$^2$ after 270 hours. After 1350 hours of operation, the cell potential slightly decreased because of a corresponding increase in the IR drop. The OCV and polarization were stable at 1055 to 1060 mV and at ca. 105 mV, respectively. Carbonate (73 mg) was added to the cell after 600 hours of operation. The addition had an insignificant effect on performance, indicating that the optimum level of impregnation had been achieved.

Earlier run cells employed electrolyte matrices of uniform thickness but high initial porosity (>65%), relatively large mean pore size (>1.0 micron), and a wide pore-size distribution. A good peak performance was obtained, but this was followed by fast decay. By improving LiAlO$_2$ particle characteristics (vide cells EPRI-68 and EPRI-69), tape matrices with a more uniform microstructure were obtained. Such structures showed better performance and stability.

The performance characteristics of the EPRI-68 and EPRI-69 cells are summarized in Table 2 below.

For the runs discussed above the test cell fixtures were modified to minimize the risk of the matrix (electrolyte structure) cracking by misalignment. With this modification, however, the reference electrodes did not function properly, so separate anode and cathode performances could not be obtained for these cells.

EXAMPLE X

The green electrolyte matrix tapes used in those fuel cell runs described in EXAMPLE IX prepared from Batch C-18 LiAlO$_2$. C-18 LiAlO$_2$ was, in turn, prepared by firing in air at 650° C. for 20 hours an equimolar mixture of Li$_2$CO$_3$ and Boehmite alumina (Catapal SB Al$_2$O$_3$). After grinding the powder to −100 mesh, it was further fired in air at 900° C. for 16 hours. The resulting LiAlO$_2$ product had a gamma phase and a surface area of about 10 m$^2$/g.

The tape casting procedure involved mixing 70 g of the C-18 LiAlO$_2$ powder and 100 g of CB-131 binder solution in a pint-size mill bottle with 300 g of 0.5 in alumina balls and placing the sealed bottle in a vibratory mill to shake for 2 hours. After milling, the viscosity of the slurry was measured by a Brookfield viscosimeter. A value of 1350 cps was obtained. The slurry was degassed under vacuum in a jar for about 10 minutes and cast with a doctor blade at a blade opening of 50 mils on a Teflon-coated glass plate. The dried tape had a thickness of 27 mils and a porosity of 64%.

EXAMPLE XI

Endurance testing of fuel cells equipped with tape cast LiAlO$_2$ matrices has also been completed. Three cm$^2$ cells were utilized for the more germane of these tests.

The test cells had a nickel anode collector and a 316-SS cathode collector. The fuel was 75% H$_2$/25% CO$_2$ humidified at 60° C., and the oxidant was 30% CO$_2$/70% air humidified at 25° C. All cells had a Ni+10% Cr anode, a Ni cathode, and a bubble barrier. The cells were assembled, started and operated very much like cells EPRI-68 and EPRI-69 were. The results for these cells are summarized in Table 3.

TABLE 2
SUMMARY OF CELLS OPERATED WITH TAPE-CAST ELECTROLYTES AND ELECTROLYTE MATRIXES

| | | | | PERFORMANCE (PEAK/FINAL) | | | | | | |
|---|---|---|---|---|---|---|---|---|---|---|
| | | | CAR- | CELL | | IR- | WET-SEAL | | | |
| CELL | BUBBLE BARRIER | TAPE MATRIX | BONATE SOURCE | POTENTIAL* mV | OCV | DROP | ANODE % | CATHODE % | N$_2$C.O. | COMMENTS |
| EPRI-68 | Anode only | TLA-21-17 binder partially removed | CO$_3^-$ crystals on top of the anode collector | 850 | 1053 | 55 | — | — | — | Polarization 50 mV higher expected initially and increased with time |
| EPRI-69 | Anode only | Lithcoa 14C, binder partially removed | CO$_3^-$ crystals on top of the anode collector | 900 | 1057 | 50 | — | — | — | Good performance stability |

*Potential at 160 mA/cm$^2$
Active area; 3 cm$^2$

TABLE 3
PERFORMANCE OF MCFC CELLS WITH TAPE CAST MATRICES

| Cell | Matrix | Lifetime | Cell Potential Peak | Final | Comment |
|---|---|---|---|---|---|
| EPRI-119 | Mix III #1 | 2350 | 905 | 835 | Increasing anode/cathode cathode polarization and IR-drop. Carbonate added |

TABLE 3-continued

PERFORMANCE OF MCFC CELLS WITH TAPE CAST MATRICES

| Cell | Matrix | Life-time | Cell Potential Peak | Final | Comment |
|---|---|---|---|---|---|
| EPRI-120 | Mix III #4/5 | 2830 | 890 | 870 | Little increase in anode polarization. Stable cathode, OCV and IR. Carbonate added |
| EPRI-121 | Mix III #7 | 1824 | 897 | 887 | Stable, only 10 mV drop. Carbonate added |

In none of the endurance tests of cells EPRI-119—EPRI-120 was there any cracking of the tape cast matrix.

The invention may be embodied in other forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method for preparing an electrolyte structure for a molten carbonate fuel cell, said method comprising the steps of:
    so casting a non-aqueous slip containing particles of $LiAlO_2$, a binder, and a solvent as to form a flexible cast tape of selected thickness;
    removing the solvent from the cast tape to produce a green tape having $LiAlO_2$ particles held together by the binder;
    subsequently so treating the green tape as to remove the binder therefrom and create a porous matrix consisting essentially of $LiAlO_2$; and
    impregnating the porous matrix with a carbonate electrolyte;
    said $LiAlO_2$ particles being produced by heat treating an equimolar mixture of $Li_2CO_3$ and $Al_2O_3$.

2. A method for preparing an electrolyte structure for a molten carbonate fuel cell, said method comprising the steps of:
    so casting a non-aqueous slip containing uncoated particles of $LiAlO_2$, a binder, and a solvent as to form a flexible cast tape of selected thickness;
    removing the solvent from the cast tape to produce a green tape having $LiAlO_2$ particles held together by the binder;
    subsequently so treating the green tape as to remove the binder therefrom and create a porous matrix consisting essentially of $LiAlO_2$; and
    impregnating the porous matrix with a carbonate electrolyte;
    said $LiAlO_2$ particles being produced by spray drying an aqueous slurry containing LiOH and $Al_2O_3$ to produce $\beta$-$LiAlO_2$ particles and then heat treating those particles to transform the particles to the gamma phase and to reduce the surface area of the particles.

3. A method for preparing an electrolyte structure for a molten carbonate fuel cell, said method comprising the steps of:
    preparing a castable, non-aqueous slip comprising particles of $LiAlO_2$, a binder, and a solvent;
    subjecting said slip to vibratory milling to break up any agglomerates of $LiAlO_2$ particles that may be present and to uniformly disperse the particles in the solvent;
    so casting said slip as to form a flexible cast tape of selected thickness;
    removing the solvent from the cast tape to produce a green tape having $LiAlO_2$ particles held together by the binder;
    subsequently so treating the green tape as to remove the binder therefrom and create a porous matrix consisting essentially of $LiAlO_2$; and
    impregnating the porous matrix with a carbonate electrolyte.

4. A method for preparing an electrolyte structure for a molten carbonate fuel cell, said method comprising the steps of:
    so casting a non-aqueous slip containing particles of $LiAlO_2$, a binder, and a solvent as to form a flexible cast tape of selected thickness;
    removing the solvent from the cast tape to produce a green tape having $LiAlO_2$ particles held together by the binder;
    subsequently so treating the green tape as to remove the binder therefrom and create a porous matrix consisting essentially of $LiAlO_2$; and
    impregnating the porous matrix with a carbonate electrolyte by placing said matrix in face-to-face relationship with a carbonate tape and so heating the resulting assemblage to a temperature above the melting point of the carbonate that said carbonate will be melted and wicked into the pores of the matrix by capillary action.

* * * * *